United States Patent Office 2,875,174
Patented Feb. 24, 1959

2,875,174

SULFUR VULCANIZED RUBBER CONTAINING A MIXTURE OF ANTIOXIDANTS, AND PROCESS OF OBTAINING SAME

Frederick J. Webb, Cuyahoga Falls, Ohio, assignor to The Firestone Tire & Rubber Company, Akron, Ohio, a corporation of Ohio No Drawing. Application July 23, 1957
Serial No. 673,579

19 Claims. (Cl. 260—45.8)

This invention relates to the use of a mixture of two different antioxidants in rubber. The mixture of the two antioxidants is more effective than the use of the same amount of either antioxidant alone. The invention relates to use in natural rubber and the usual synthetic rubbers including the homopolymers and conjugated dienes and copolymers of conjugated dienes and ethylenically unsaturated monomers; as, for example, polyisoprenes, polybutadienes, butadiene-styrene copolymers, butadiene-acrylonitrile copolymers, etc.

One of the antioxidants is a di(hydroxyphenyl)methane of the formula

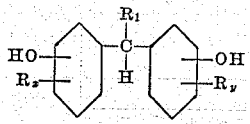

in which $x$ and $y$ are each numbers greater than zero and not greater than 2, each R is a straight- or branched-chain alkyl or aralkyl or cycloalkyl group and contains no more than 16 carbon atoms, the hydroxyphenyl groups are selected from the class consisting of 2-hydroxy and 4-hydroxy phenyl, and $R_1$ is of the group consisting of hydrogen and alkyl groups of 1 to 10 carbon atoms. These compounds are ordinarily prepared by condensing a phenol with an aldehyde by any well-known procedure. The two hydroxyphenyl groups may be the same or different. The substituent groups of these nuclei include, for example, methyl, ethyl, propyl, butyl, amyl, hexyl, heptyl, octyl, nonyl, dodecyl, cyclohexyl, cyclopentyl, benzyl, alpha-methylbenzyl, beta-phenylethyl, etc. The aldehyde condensing agent is formaldehyde, trioxane, acetaldehyde, paraldehyde, propionaldehyde, a butyraldehyde, an hexaldehyde or a nonaldehyde or the like. Representative compounds include:

Di(2-hydroxy-3,5-dimethylphenyl)methane
Di-1,1-(2-hydroxy-3,5-dimethylphenyl)ethane
Di(2-hydroxy-3-butyl-5-methylphenyl)methane
Di-1,1-(2-hydroxy-3-butyl-5-methylphenyl)ethane
Di-1,1-(2-methyl-4-hydroxy-5-butylphenyl)ethane
Di-1,1-(2-methyl-4-hydroxy-5-amylphenyl)ethane
Di(2-methyl-4-hydroxy-5-octylphenyl)methane
Di(2-methyl-4-hydroxy-5-cyclohexylphenyl)methane
Di-1,1-(3-methyl-4-hydroxy-6-methylphenyl)butane
Di-1,1-(2-methyl-4-hydroxy-5-butylphenyl)butane
Di-1,1-(2-hydroxy-3,5-dimethylphenyl)nonane
Di(2-hydroxy-3,5-di-alpha-methylbenzylphenyl)methane
Di-1,1-(3,5-dimethyl-4-hydroxyphenyl)ethane
Di(3,5-dimethyl-4-hydroxyphenyl)methane
Di(3-isopropyl-4-hydroxy-5-t-butylphenyl)methane
Di(3-methyl-4-hydroxy-5-t-butylphenyl)methane In the foregoing formulae, butyl is preferably t-butyl, octyl is preferably t-octyl or tt-octyl, and amyl is preferably t-amyl or sec-amyl. The compounds containing butyl, amyl and octyl substituents are preferred.

In the claims the foregoing formula is identified as Formula I.

The other component of the antioxidant mixture is a hydroquinone derivative having the following general formula:

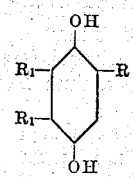

where R and $R_1$ are from the class consisting of —X and —SX where X is from the class consisting of alkyl groups of 1 to 12 carbon atoms, and cycloalkyl, aralkyl, unsubstituted aryl, hydrocarbon-substituted aryl and benzothiazolyl groups and $R_1$ may be hydrogen and one $R_1$ is hydrogen. This formula is identified as Formula II in the claims.

Representative compounds are:

2-phenylhydroquinone
2,5-diphenylhydroquinone
2-phenylthiohydroquinone
2,5-diphenylthiohydroquinone
2,6-diphenylhydroquinone
2-dodecylhydroquinone
2-dodecylthiohydroquinone
2-alpha-naphthylhydroquinone
2-beta-naphthylhydroquinone
2-benzylhydroquinone
2-alpha-naphthylthiohydroquinone
2-o-tolylhydroquinone
2-cyclohexylhydroquinone
2,5-dicyclopentylhydroquinone
2-octylhydroquinone
2-octylthiohydroquinone
2-phenyl-5-butylhydroquinone
2-octyl-6-methylhydroquinone
2-phenylthio-5-hexylhydroquinone
2-cyclohexyl-6-butylhydroquinone
2,6-dioctylhydroquinone
2-alpha-naphthyl-6-phenylhydroquinone
2-dodecylthio-5-phenylhydroquinone
2-butylthio-6-p-tolylhydroquinone
2,5-ditolylhydroquinone
2-tolylthiohydroquinone
2-(ethylphenyl)hydroquinone
2,5-di-(ethylphenyl)hydroquinone
2-(butylphenyl)hydroquinone
2,5-di-(butylphenyl)hydroquinone
2,5-di-(butylphenylthio)hydroquinone
2-(butylphenylthio)hydroquinone
2,6-di-(phenylthio)hydroquinone
2-benzothiazolylthiohydroquinone
2,5-di-(benzothiazolylthio)hydroquinone Hydroquinone or thiohydroquinone may be substituted with either one or two phenyl groups which in turn are substituted with any alkyl group up to and including dodecyl. The alkyl substituent or substituents may be in any position.

Hydroquinone is very slightly soluble in rubber and is not included in the mixtures of this invention for that reason. The hydroquinone derivatives which are included in the mixtures are much more soluble and effective in rubber than hydroquinone.

The two components of the antioxidant mixture may be used in equal proportions or in any proportions which include at least a substantial amount of each of the components. Thus, one part of either of the components may be used with nine parts of the other. Regardless.

of the proportions in which the two components are utilized, when used in relatively small amounts as, for example, 0.1 or 2 or 5 parts per 100 parts of rubber, one has a synergistic effect on the other so that the mixture of the two materials has a greater effect than the same amount of either component employed without the other. The two components may be used in equal parts by weight, but this is not necessary as any substantial amount of either component may be used.

The antioxidant mixture may be used generally in rubber stocks, including stocks reinforced with carbon black and stocks containing titanium dioxide, zinc oxide, calcium carbonate, etc.

Both (1) the di(hydroxyphenyl)methanes and (2) hydroquinone derivatives are known to be antioxidants. It has not been known that a mixture of the two materials gives better antioxidant protection than either component of the mixture alone. The following test results illustrate the antioxidant effect obtained by such mixtures. The di(hydroxyphenyl)methanes used in carrying out these tests can be prepared as described in Ambelang 2,647,102 and the di(hydroxyphenyl)methanes there disclosed may be used. The hydroquinone derivatives utilized in carrying out the tests are described in the literature or may be made by the processes there described.

Each of the test samples was prepared by adding one part of the two-component antioxidant mixture to a masterbatch prepared according to the following formula, except that the test materials used in the stocks tested and recorded in Table I included no wax:

| | Parts by weight |
|---|---|
| Pale crepe rubber | 100.00 |
| Zinc oxide | 70.00 |
| Titanium oxide | 20.00 |
| Ultramarine blue | 0.20 |
| Stearic acid | 1.20 |
| Sulfur | 3.00 |
| Accelerator | 0.90 |
| Wax | 2.00 |
| Total | 197.30 |

All stocks tested were cured at 280° F. for 60 minutes. The modulus, tensile strength and elongation were measured in pounds per square inch, before and after aging in an air oven.

It is to be understood that this formula is merely representative. It illustrates a stock suitable for use in white sidewall tires. Other reinforcing agents than titanium oxide may be employed. Synthetic rubbers are protected as well as natural rubbers. Accelerators, etc., will be selected as required, as is well known in the art.

The amount of oxygen absorbed by the various samples was determined as described in the article by J. R. Shelton and Hugh Winn in Industrial and Engineering Chemistry, vol. 38, page 71 (1946); ibid., vol. 40, page 2081 (1948). By plotting the milliliters of oxygen absorbed per gram of rubber polymer present in a formulated stock, against the hours required for the absorption, and drawing a curve through the points, the straightline portion of each curve represents the constant rate of oxygen absorption, and by determining the angle of each such slope, comparative rates of absorption were obtained and are given in certain of the following tables.

The physical properties of the stocks before and after aging are recorded. In the first test, the results of which are recorded in Table I, one part of an antioxidant mixture was employed in which 2-phenylhydroquinone and a di(hydroxyphenyl)methane were used in different proportions. The wax was omitted from the formula, as indicated by the amount of the masterbatch employed. The results are compared with those obtained by using the condensation product in an amount equal to this total, without any 2-phenylhydroquinone.

Table I

| | Control | A | B |
|---|---|---|---|
| Masterbatch | 195.3 | 195.3 | 195.3 |
| Di-1,1-(2-methyl-4-hydroxy-5-t-butylphenyl)ethane | 1.0 | 0.7 | 0.6 |
| 2-phenylhydroquinone | | 0.3 | 0.4 |
| Normal stress-strain properties: | | | |
| Modulus 300% | 375 | 425 | 425 |
| Modulus 400% | 825 | 825 | 975 |
| Tensile | 3,325 | 3,175 | 3,400 |
| Elongation | 630 | 630 | 630 |
| Oxygen-absorption at 90° C.: | | | |
| Hrs. for absorption of 5 ml. oxygen per gram polymer | 58.0 | 85.0 | 89.0 |
| Total oxygen-absorbed per gram polymer | 20.4 | 13.4 | 13.8 |
| Total hours in oxygen absorber | 186 | 186 | 186 |
| Slope (constant rate portion) | 0.070 | 0.037 | 0.034 |

The foregoing results clearly show that oxygen had less effect on the properties of the compounds containing a mixture of the two antioxidants than on the control which contained only the one antioxidant. Comparative figures are not available on the same masterbatch containing one part of 2-phenylhydroquinone, cured and tested at the same time. However, subsequent tables show that the mixtures are more effective than 2-phenylhydroquinone alone.

In the next test, di(2-methyl-4-hydroxy-5-t-octylphenyl) methane was used with 2-phenylhydroquinone, and the test compares a mixture of equal parts of the two with one part of each alone.

Table II

| | Control A | Control B | Test |
|---|---|---|---|
| Masterbatch | 197.3 | 197.3 | 197.3 |
| Di(2-methyl-4-hydroxy-5-t-octylphenyl)methane | 1.0 | | 0.5 |
| 2-phenylhydroquinone | | 1.0 | 0.5 |
| Normal stress-strain properties: | | | |
| Modulus 300% | 400 | 400 | 425 |
| Modulus 400% | 825 | 875 | 825 |
| Tensile | 3,600 | 3,450 | 3,425 |
| Elongation | 640 | 630 | 630 |
| Oxygen-absorption at 90° C.: | | | |
| Hrs. for absorption of 5 ml. oxygen per gram polymer | 51.5 | 84 | 100 |
| Total hrs. in oxygen absorber | 119 | 119 | 119 |
| Total oxygen absorbed per gram polymer | 12.4 | 7.7 | 6.4 |
| Slope (straight line portion) | 0.91 | 0.049 | 0.044 |

The test sample of Table II took 100 hours to absorb 5 milliliters of oxygen per gram of rubber, compared with the lesser periods of 51.5 and 84 hours, respectively, for the different compounds alone. This shows the decided synergistic effect the components exerted in the mixture. Also, after staying 119 hours in the absorption apparatus the mixture absorbed only 6.4 milliliters of oxygen (calculated to 25° C. at 760 mm. in all tests reported herein) per gram of the rubber in the sample, as compared with the greater absorptions of 12.4 and 7.7 for the two controls.

In the next test, 2-phenylthiohydroquinone and di-1,1-(2-methyl-4-hydroxy-5-t-butylphenyl)ethane were used as controls and their effectiveness compared with a mixture of the two.

Table III

| | Control | Test | Control |
|---|---|---|---|
| Masterbatch | 197.3 | 197.3 | 197.3 |
| 2-phenylthiohydroquinone | 1.0 | 0.5 | |
| Di-1,1-(2-methyl-4-hydroxy-5-t-butylphenyl)ethane | | 0.5 | 1.0 |
| Normal stress-strain properties: | | | |
| Modulus 300% | 475 | 500 | 425 |
| Modulus 400% | 1,050 | 975 | 950 |
| Tensile | 3,275 | 3,300 | 3,375 |
| Elongation | 600 | 600 | 610 |
| Oxygen-absorption at 90° C.: | | | |
| Hrs. for absorption of 6 ml. oxygen per gram polymer | 77.5 | 92.0 | 55.0 |
| Total oxygen absorbed | 8.7 | 6.5 | 9.6 |
| Total hrs. in oxygen absorber | 96.5 | 96.5 | 96.5 |
| Slope (constant rate portion) | 0.054 | 0.045 | 0.097 |

The results recorded in the foregoing table show the mixture was a better antioxidant than either of the controls. The mixture took longer to absorb 5 ml. of oxygen, and on staying in the absorption apparatus for a prolonged period it absorbed less oxygen than either of the controls.

Even the small amount of a hydroquinone employed in these tests reduced the oxygen absorption appreciably.

The condensation product of the following test was obtained from a 2,6-dialkylphenol, whereas the condensation products of the foregoing tests were all made from different 2,5-dialkylphenols. The control and test were not run simultaneously, but the results are comparable.

Table IV

|  | Control | Test |
| --- | --- | --- |
| Masterbatch | 197.3 | 197.3 |
| Di(3-isopropyl-4-hydroxy-5-t-butylphenyl)methane | 1.0 | 0.5 |
| 2-phenylthiohydroquinone |  | 0.5 |
| Normal stress-strain properties: |  |  |
| Modulus 300% | 425 | 400 |
| Modulus 400% | 800 | 825 |
| Tensile strength | 3,100 | 3,325 |
| Elongation | 640 | 630 |
| Oxygen absorption at 90° C.: |  |  |
| Hrs. for absorption of 5 ml./g. polymer | 53.5 | 75 |
| Hrs. for absorpiton of 10 ml./g. polymer | 93.5 | 109 |
| Total oxygen absorbed, ml./g. polymer | 10.3 | 16.4 |
| Total hours in absorber | 95 | 140 |
| Slope (constant rate portion) | 0.094 | 0.023 |

The slope alone shows that the mixture in the test material absorbed oxygen much more slowly than the condensation product when used alone, as in the control.

The next table shows the use of the different components of a mixture in varying proportions.

Table V

|  | Test A | Test B | Test C |
| --- | --- | --- | --- |
| Masterbatch | 197.3 | 197.3 | 197.3 |
| 2-phenylthiohydroquinone | 0.25 | 0.5 | 0.75 |
| Di-1,1-(2-methyl-4-hydroxy-5-t-butylphenyl)ethane | 0.75 | 0.5 | 0.25 |
| Normal stress-strain properties: |  |  |  |
| Modulus 300% | 425 | 425 | 475 |
| Modulus 400% | 925 | 950 | 1,000 |
| Tensile strength | 3,575 | 3,700 | 3,650 |
| Elongation | 635 | 645 | 630 |
| After aging 2 days in airoven at 212° F.: |  |  |  |
| Modulus 300% | 700 | 750 | 750 |
| Modulus 400% | 1,300 | 1,300 | 1,275 |
| Tensile strength | 2,750 | 2,450 | 2,575 |
| Percent Tensile retained | 77 | 66 | 71 |
| Elongation | 530 | 510 | 530 |
| Oxygen absorption at 90° C.: |  |  |  |
| Hrs. for absorption of 5 ml./g. polymer | 82.5 | 94.0 | 94.0 |
| Hrs. for absorption of 10 ml./g. polymer | 140 | 152 | 149 |
| Total absorbed in 166 hours, ml./g. polymer | 13.7 | 12.5 | 13.3 |

The results of the foregoing table show that various proportions of the component parts of the mixtures have a comparable beneficial antioxidant effect in the stock.

The reported results are illustrative. Other rubbers may be used with other corresponding ingredients.

By sulfur vulcanization is meant the curing of rubber by reaction with either free sulfur or a vulcanizing agent of the sulfur-donor type. Known agents of the latter type include the various phenol polysulfides including the alkyl derivatives thereof, the xanthogen polysulfides, the thiuram disulfides and polysulfides, various amine sulfides including dialkylamine polysulfides and reaction products of primary amines with excess sulfur. Known vulcanization accelerators are useful in speeding up the vulcanization process and are operative herein, especially the relatively active accelerators including the thiazole sulfenamides, e. g. cyclohexyl benzothiazole sulfenamide, thiazoline sulfenamides, thiocarbamyl sulfenamides, mercaptothiazoles, mercaptothiazolines, thiazolyl mono- and di-sulfides, the dithiocarbamates, the thiuram sulfides, the xanthogen sulfides, metallic salts of mercaptothiazoles or mercaptothiazolines or dithiocarbamic acids. One or more accelerator activator is often used with any of the accelerators mentioned where desired, and such activators include the various derivatives of guanidine known in the rubber art, amine salts of inorganic and organic acids, various amines themselves, alkaline salts such as sodium acetate and the like, as well as other activators known to the art. Additionally, two or more accelerators or accelerator combinations are sometimes desirable in a single rubber compound. Many of the accelerators mentioned above are suitable in latex formulations, especially such common accelerators as piperidinium pentamethylene dithiocarbamate, zinc butyl xanthate, zinc ethyl xanthate, zinc salt of mercaptobenzothiazole, zinc dimethyl dithiocarbamate, and zinc dibutyl dithiocarbamate. Although vulcanization is usually accomplished by heating a vulcanizable rubber composition at a temperature in the range of 240 to 400° F. for a time ranging from several hours to a few seconds, vulcanization does take place at lower temperatures such as ordinary room temperature. It is quite common to vulcanize a latex film containing an ultra accelerator by allowing the film to remain at room temperature for several hours or a few days.

The invention is covered in the claims which follow. What I claim is:

1. Sulfur-vulcanized rubber of the class consisting of natural and synthetic rubbers from the class consisting of homopolymers of conjugated dienes and copolymers of a conjugated diene and an ethylenically unsaturated monomer, which rubber contains an antioxidizing amount of both (a) a compound having the composition of Formula I in which $x$ and $y$ are each at least one and not greater than two, each R is from the class consisting of alkyl, aralkyl and cycloalkyl groups containing not more than 16 carbon atoms; the hydroxyphenyl groups are selected from the class consisting of 2-hydroxy and 4-hydroxy phenyl, and $R_1$ is from the class consisting of hydrogen and alkyl groups of one to ten carbon atoms and (b) a compound having the composition of Formula II in which R and each $R_1$ are from the class consisting of hydrogen and —X and —SX groups in which X is from the class consisting of alkyl, cycloalkyl and aralkyl groups containing one to twelve carbon atoms, and unsubstituted aryl, hydrocarbon-substituted aryl and benzothiazolyl groups, at least one $R_1$ being hydrogen.

2. Sulfur-vulcanized rubber according to claim 1 in which the compound having the composition of Formula II is 2-phenylhydroquinone.

3. Sulfur-vulcanized rubber according to claim 1 in which the compound having the composition of Formula II is 2-phenylthiohydroquinone.

4. Sulfur-vulcanized rubber according to claim 1 in which the compound having the composition of Formula I is di-1,1-(2-methyl-4-hydroxy-5-t-butylphenyl)-ethane.

5. Sulfur-vulcanized rubber according to claim 1 in which the compound having the composition of Formula I is di(3-isopropyl-4-hydroxy-5-t-butylphenyl)methane.

6. Sulfur-vulcanized rubber according to claim 1 in which the compound having the composition of Formula I is di(2-methyl-4-hydroxy-5-t-octylphenyl)methane.

7. Sulfur-vulcanized rubber according to claim 1 in which the compound having the composition of Formula I is di-1,1-(2-methyl-4-hydroxy-5-t-butylphenyl)ethane and the compound having the composition of Formula II is 2-phenylhydroquinone.

8. Sulfur-vulcanized rubber according to claim 1 in which the compound having the composition of Formula I is di-1,1-(2-methyl-4-hydroxy-5-t-butylphenyl)ethane and the compound having the composition of Formula II is 2-phenylthiohydroquinone.

9. Sulfur-vulcanized rubber according to claim 1 in which the compound having the composition of Formula I is di(3-isopropyl-4-hydroxy-5-t-butylphenyl)methane and the compound having the composition of Formula II is 2-phenylthiohydroquinone.

10. Sulfur-vulcanized rubber according to claim 1 in which the compound having the composition of Formula I is di(2-methyl-4-hydroxy-5-t-octylphenyl)methane and the compound having the composition of Formula II is 2-phenylhydroquinone.

11. The process of vulcanizing natural and synthetic rubbers of the class consisting of homopolymers of conjugated dienes and copolymers of a conjugated diene and an ethylenically unsaturated monomer, which process comprises vulcanizing the rubber with sulfur in the presence of an antioxidizing amount of (a) a compound having the composition of Formula I in which $x$ and $y$ are each at least one and not greater than two, each R is from the class consisting of alkyl, aralkyl and cycloalkyl groups containing not more than 16 carbon atoms, the hydroxyphenyl groups are selected from the class consisting of 2-hydroxy and 4-hydroxy phenyl, and $R_1$ is from the class consisting of hydrogen and alkyl groups of one to ten carbon atoms and (b) a compound having the composition of Formula II in which R and each $R_1$ are from the class consisting of hydrogen and —X and —SX groups in which X is from the class consisting of alkyl, cycloalkyl and aralkyl groups of one to twelve carbon atoms and unsubstituted aryl, hydrocarbon-substituted aryl and benzothiazolyl groups, at least one $R_1$ being hydrogen.

12. The process of vulcanizing rubber according to claim 11 in which the compound with the composition of Formula II is 2-phenylhydroquinone.

13. The process of vulcanizing rubber according to claim 11 in which the compound with the composition of Formula II is 2-phenylthiohydroquinone.

14. The process of vulcanizing rubber according to claim 11 in which the compound with the composition of Formula I is di-1,1-(2-methyl-4-hydroxy-5-t-butylphenyl)ethane.

15. The process of vulcanizing rubber according to claim 11 in which the compound with the composition of Formula I is di(3-isopropyl-4-hydroxy-5-t-butylphenyl)methane.

16. The process of vulcanizing rubber according to claim 11 in which the compound with the composition of Formula I is di(2-methyl-4-hydroxy-5-t-butylphenyl)-methane.

17. The process of vulcanizing rubber according to claim 11 in which the compound with the composition of Formula I is di-1,1-(2-methyl-4-hydroxy-5-t-butylphenyl)ethane and the compound with the composition of Formula II is 2-phenylhydroquinone.

18. The process of vulcanizing rubber according to claim 11 in which the compound with the composition of Formula I is di-1,1-(2-methyl-4-hydroxy-5-t-butylphenyl)ethane and the compound with the composition of Formula II is 2-phenylthiohydroquinone.

19. The process of vulcanizing rubber according to claim 11 in which the compound with the composition of Formula I is di(3-isopropyl-4-hydroxy-5-t-butylphenyl)-methane and the compound with the composition of Formula II is 2-phenylthiohydroquinone.

References Cited in the file of this patent

UNITED STATES PATENTS

| | | |
|---|---|---|
| 2,538,355 | Davis et al. | Jan. 16, 1951 |
| 2,549,118 | Newby | Apr. 17, 1951 |
| 2,731,442 | Forman | Jan. 17, 1956 |